United States Patent [19]

Sakamoto

[11] 4,257,072
[45] Mar. 17, 1981

[54] METHOD AND APPARATUS USING MULTIPLE DEFLECTIONS FOR REPRODUCING A HALFTONE IMAGE BY SCANNING

[75] Inventor: Takashi Sakamoto, Kyoto, Japan

[73] Assignee: Dainippon Screen Seizo Kabushiki Kaisha, Kyoto, Japan

[21] Appl. No.: 843,046

[22] Filed: Oct. 17, 1977

Related U.S. Application Data

[63] Continuation-in-part of Ser. No. 695,780, Jun. 14, 1976, abandoned.

[30] Foreign Application Priority Data

Jun. 18, 1975 [JP] Japan .................. 50-73082

[51] Int. Cl.³ .............................. H04N 1/22
[52] U.S. Cl. .................. 358/298; 358/302
[58] Field of Search ............... 358/296, 298, 300, 302, 358/283, 75, 78; 179/100.31, 100.3 E, 100.3 H; 346/1, 108, 109, 76 L

[56] References Cited

U.S. PATENT DOCUMENTS

| | | | |
|---|---|---|---|
| 2,124,030 | 7/1938 | Douden | 179/100.3 T |
| 2,152,348 | 3/1939 | Finch | 358/302 |
| 2,294,643 | 9/1942 | Wurzburg, Jr. | 358/298 |
| 2,468,049 | 4/1949 | Dimmick | 179/100.31 |
| 2,818,465 | 12/1957 | Brink | 358/292 |
| 3,541,253 | 11/1970 | Shonnard | 358/302 |
| 3,646,262 | 2/1972 | Moe | 358/283 |
| 3,657,472 | 4/1972 | Taudt et al. | 358/75 |
| 3,800,303 | 3/1974 | Picquender et al. | 358/300 |
| 3,944,323 | 3/1976 | Starkweather | 358/302 |

*Primary Examiner*—Raymond F. Cardillo, Jr.
*Attorney, Agent, or Firm*—Lackenbach, Lilling & Siegel

[57] ABSTRACT

A method and an apparatus for reproducing a halftone image by scanning without any use of a contact screen, wherein a recording light beam of horizontally flat shape scans the surface of an aperture plate and is suitably deflected in both vertical and horizontal directions by image signals obtained from a memory according to the scanning of an original picture. The vertical deflection of the beam makes it possible for the beam width to change or the width of an intercepted portion of the beam to change, and the horizontal deflection of the beam makes it possible for the center of the beam to shift sideways in proportion to the tone density in the original as well as a required screen angle. The reproduced halftone image may have any of a range of screen angles. Further, the resolving power is greatly increased; in other words, continuous tone in the original may be more accurately reproduced since it is possible to set a width of scanning line which is narrower than the halftone dot interval.

22 Claims, 16 Drawing Figures

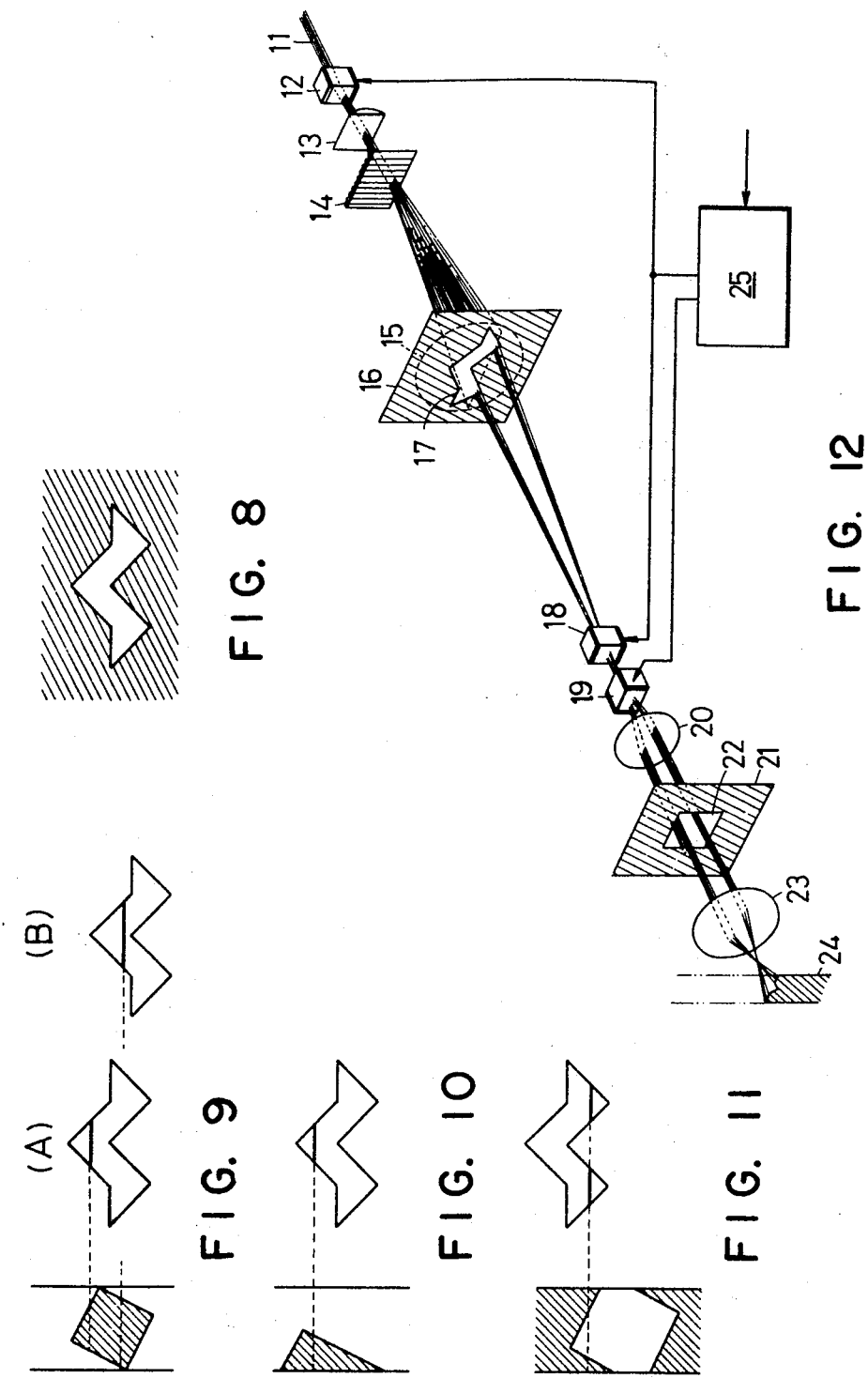

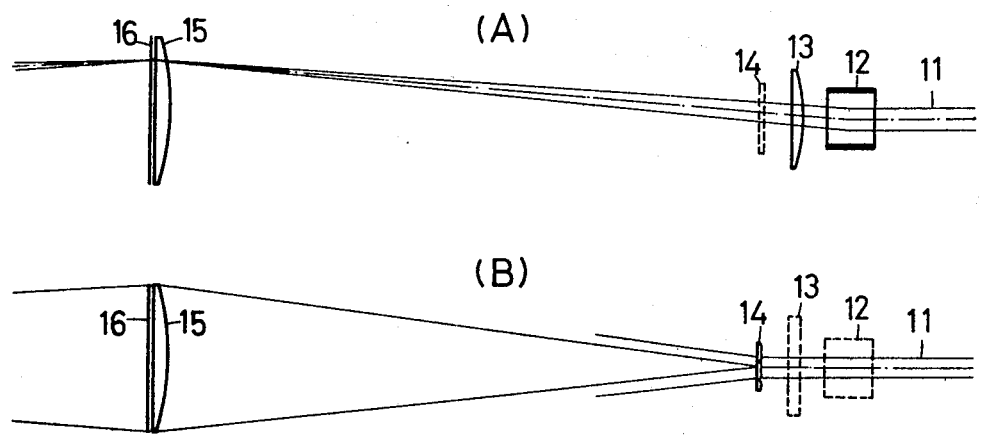
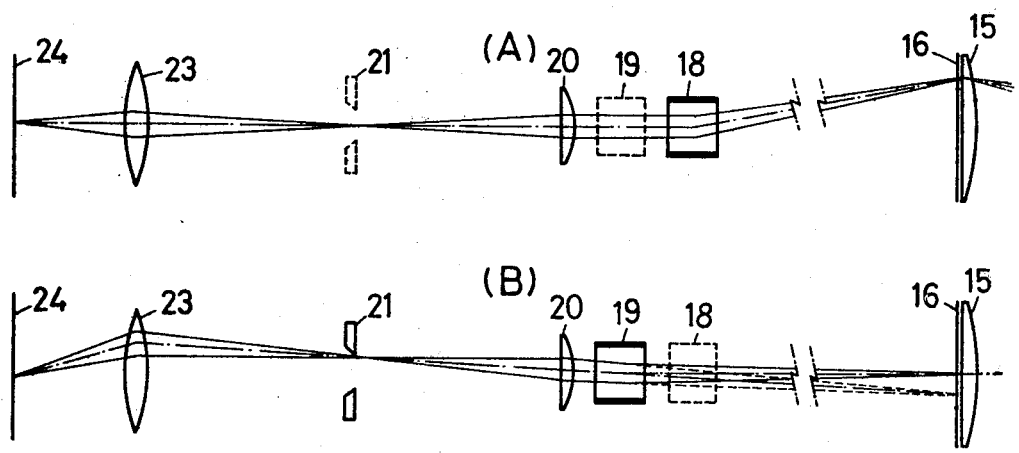
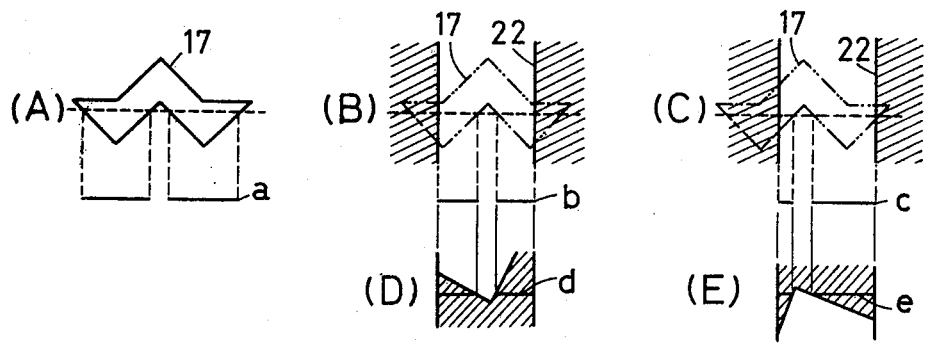
FIG. 13
FIG. 14
FIG. 15

METHOD AND APPARATUS USING MULTIPLE DEFLECTIONS FOR REPRODUCING A HALFTONE IMAGE BY SCANNING

CROSS REFERENCE TO RELATED APPLICATION

This aplication is a continuation-in-part application of U.S. patent application Ser. No. 695,780, filed June 14, 1976, now abandoned.

BACKGROUND OF THE INVENTION

The present invention generally relates to a method and apparatus for reproducing an image of an original pattern onto a photosensitive material by controlling an optical system for exposure through image signals obtained from photoelectrical scanning of the original pattern, and more particularly to a method and apparatus for reproducing a halftone image of a variety of screen angles, from a continuous-toned original pattern without any use of a contact screen.

In reproducing halftone images by scanning, such as in a color scanner or a color facsimile reproducer, most of the prior techniques have utilized a contact screen in one form or another because of the simple operation of such a system. According to one of those techniques, for example, a contact screen is placed in contact with a photosensitive material, on which a halftone image is recorded throgh the contact screen by light suitably modulated with image signals.

This technique, however, poses various problems. For instance, it is very difficult to place a contact screen and a lithographic emulsion in contact with each other, particularly when a drum-type scanner is used. The uniformity of the halftone dot size cannot, therefore, be insured. Furthermore, this technique in general requires a large investment for the apparatus itself.

In an alternative technique to solve the above-described problem, the contact screen is positioned in the light path away from the lithographic film. However, it has ben pointed out that a fatal drawback of this technique is that another drum, to be used exclusively for the contact screen, has to be provided besides two other drums for wrapping a lithographic film and an original pattern. Even by this technique the problem of the uniformity of the halftone dot size still remains unsolved.

In contrast with these prior art approaches employing a contact screen, some of the techniques now in wide use are aimed at electrically forming halftone dots in such a manner that a unit area of vignet halftone dots is divided into minute parts and different density values in such divided parts are memorized in advance. These memorized density values are read out in synchronism with scanning of an original pattern, serving to form halftone images in association with obtained image signals. The resulting halftone dots, however, are usually observed to have notched contours in cases where the divided parts are too large.

In order to eliminate various disadvantages often encountered in the prior art techniques, a certain useful and improved apparatus for reproducing halftone images without using a contact screen has recently been proposed by the applicant of the present invention. As will be referred to hereinafter, this invention, disclosed in published Japanese Patent Laid-Open Specification No. 51-88301, filed Jan. 29, 1975, has also turned out to have some inadequacies in other respects in spite of its material advantages over the prior art.

For example, halftone dots are recorded aligned in only one direction, i.e., always in the same direction as a scanning line. For this reason, it has been impossible to form a halftone plate of any other screen angle. Further, the resolving power is relatively low since it is impossible to reproduce other than one row of halftone dots with one scanning operation. In other words, the ratio of the width of the scanning line to the halftone dot interval is always limited to 1 to 1, according to this prior apparatus.

SUMMARY OF THE INVENTION

Therefore, a prime object of the present invention is to provide an improved method and apparatus for reproducing a halftone plate of a range of screen angles, without any use of contact screens, in which the above-described problems in the prior art are successfully eliminated.

According to the present invention, the number of scanning lines of a scanner can be much greater than the number of screen lines of halftone dots, which leads to a considerable increase in resolving power, and therefore sharp reproduction may be insured regardless of the dot interval.

BRIEF DESCRIPTION OF THE DRAWINGS

FIG. 8 illustrates one embodiment of an aperture plate to be used in the apparatus of the invention;

FIGS. 9 to 11 schematically illustrate how to record halftone dots by utiilzing the aperture plate of FIG. 8;

FIG. 12 schematically illustrates a preferred embodiment of the apparatus of the invention;

FIGS. 13 and 14 show front and reat parts of the apparatus of the invention shown in FIG. 12 respectively;

FIG. 15 consisting of FIGS. 15A to 15E, schematically shows how to select the width of beam to be projected on a film.

DETALED DESCRIPTION OF THE INVENTION

Before going to the detail of the present invention, for an easy comprehension of the invention, it will be necessary, briefly, to refer to the aforementioned prior published application, Japanese Laid-Open Specification No. 51-88301, from which the present invention has primarily originated.

Figure 1:
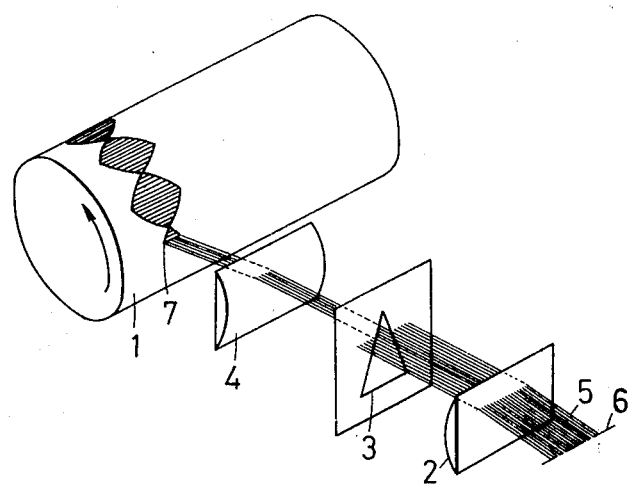
FIG. 1 perspectively illustrates an apparatus for reproducing a halftone image by scanning, similar to the present invention.
Figure 2:
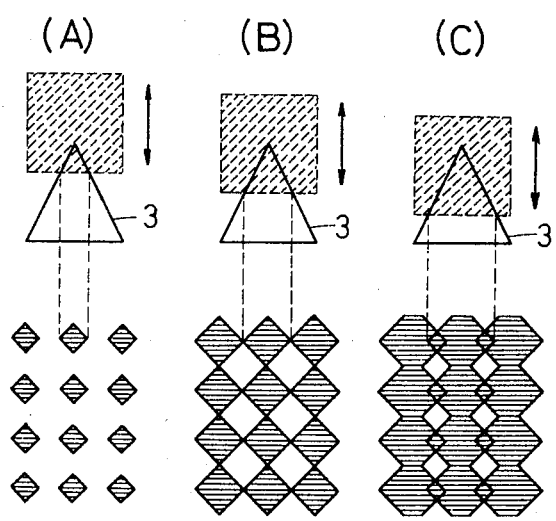
FIG. 2, consisting of FIGS. 2A, 2B and 2C, schematically illustrates various patterned halftone dots reproduced by the apparatus shown in FIG. 1.

Referring first to FIG. 1, an incident beam 5 of flat shape with respect to an axis of a recording cylinder 1 falls onto a photosensitive material placed around the rotary cylinder 1 through an optical system comprising two convex cylindrical lenses 2 and 4. The beam 5 is vertically deflected at a deflection line 6 by image signals obtained by scanning an original image. The first convex cylindrical lens 2 is so positioned that its focal line coincides with deflection line 6 so as to make the emergent beams travel parallel to the optical axis of the apparatus. The focal line 7 of the second lens 4 coincides with the photosensitive material so that the beam through lens 4 always converges onto that line 7. There is disposed a light-shielding plate 3 having a triangular or taper-shaped aperture between the two convex lenses 2 and 4, so as to adjust the beam width incident upon the line 7. The image signals cause a vertical deflection of beam 5 in proportion to the tone density in the original pattern and thereby determine what part of the aperture the beam passes through. Thus, the beam width changes according to the tone density in the original. In this way, halftone dots of various dot areas which are directly proportional to the tone density of the original are reproduced on a film as shown in FIGS. 2A to 2C.

Although this apparatus is very advantageous, at least over the prior art, it still has some faults. As has been referred to before, not only is it impossible to form a halftone plate of any screen angle other than 0°, but also resolving power is relatively low.

Figure 4:
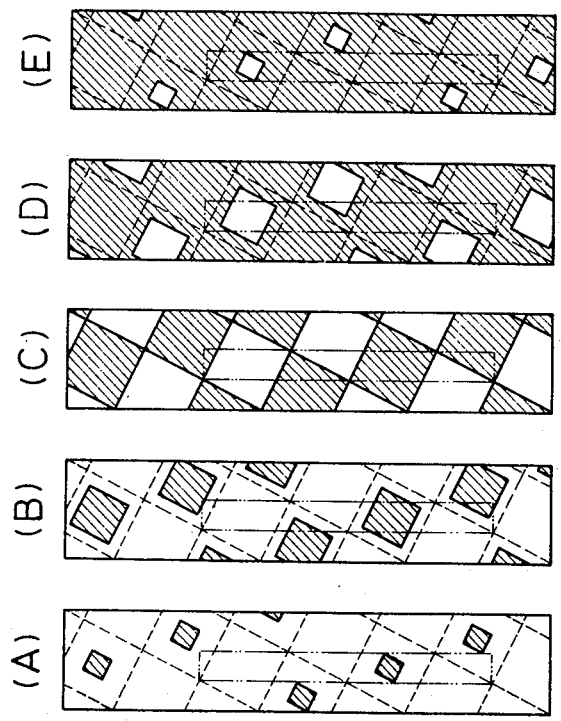
FIG. 4, consisting of FIGS. 4A to 4E, illustrates five typical dot patterns of different dot area.
Figure 3:
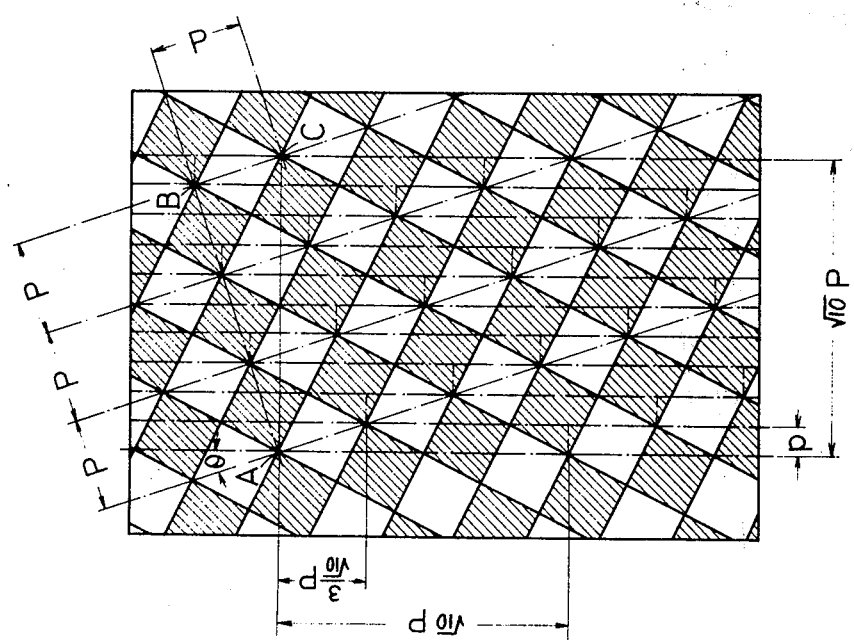
FIG. 3 shows a typical dot pattern of 50% dot area and a screen angle 0, where tan $0=\frac{1}{3}$.

Attention is now directed to FIGS. 3 and 4 showing a basic principle of the present invention. Illustrated is a halftone plate of screen angle $\theta$ with respect to a scanning direction; shadowed portions indicating a distribution of halftone dots of a 50% area. According to the present invention, $\theta$ may take any value which makes $\cot \theta$ an integer, i.e., $\theta$ can be $\cot^{-1} 1$, $\cot^{-1} 2$, $\cot^{-1} 3$, $\cot^{-1} 4$. Hereinafter $\theta$ has the value $\cot^{-1} 3$ merely for an easy explanation of the invention.

It will be apparent from FIG. 3 that where the dot interval, i.e., the distance between dot centers is "P", an identical dot pattern repeatedly occurs at intervals of $\sqrt{10}$ P both vertically and horizontally. In this example, the width of the scanning lines is arranged to be $1/\sqrt{10}$ P, so that 10 scanning lines form one repetition of this dot pattern, horizontally. Then it is seen that the pattern in a scanning line is repetitive, and repeats at intervals $\sqrt{10}$ P, and that in every scanning line exactly the same pattern as in every other occurs, but that a phase difference of $3/\sqrt{10}$ P length occurs between one line and the adjacent line.

Therefore, when such a basic dot pattern of $1\sqrt{10}$ P length is repeatedly exposed on the photosensitive material along a scanning line, with its phase delayed by $3/\sqrt{10}$ P length every scanning line, a halftone plate of screen angle $\cot^{-1} 3$ as illustrated in FIG. 3 is formed thereon.

Figure 7:
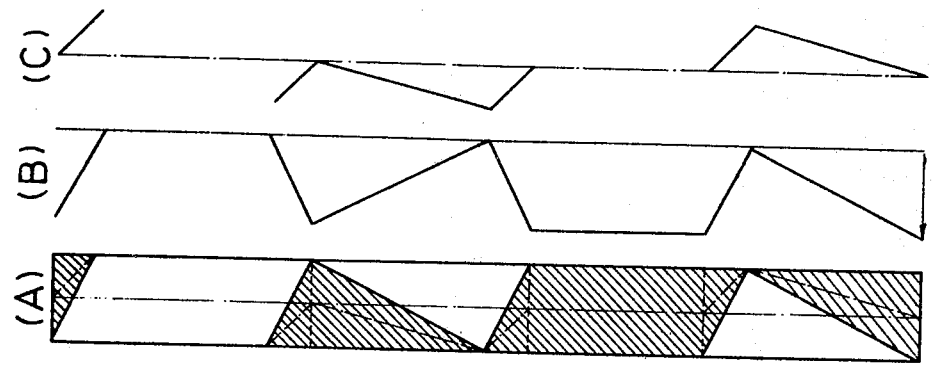
FIGS. 5 to 7 schematically illustrate the change of beam deflection angles when halftone dots shown in FIGS. 4A to 4C are recorded.
Figure 6:
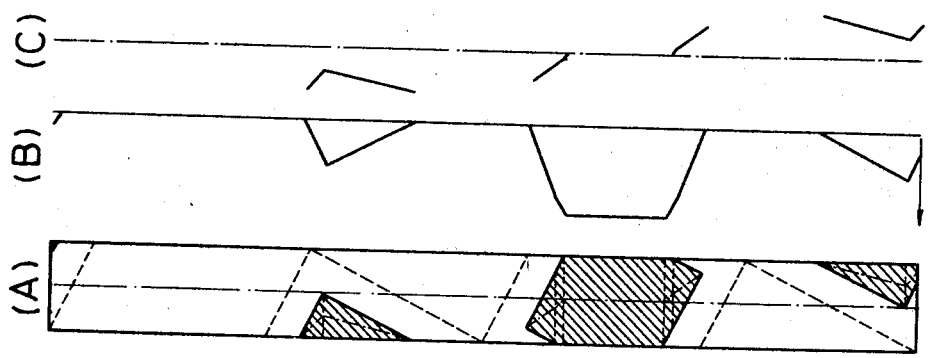
Figure 5:
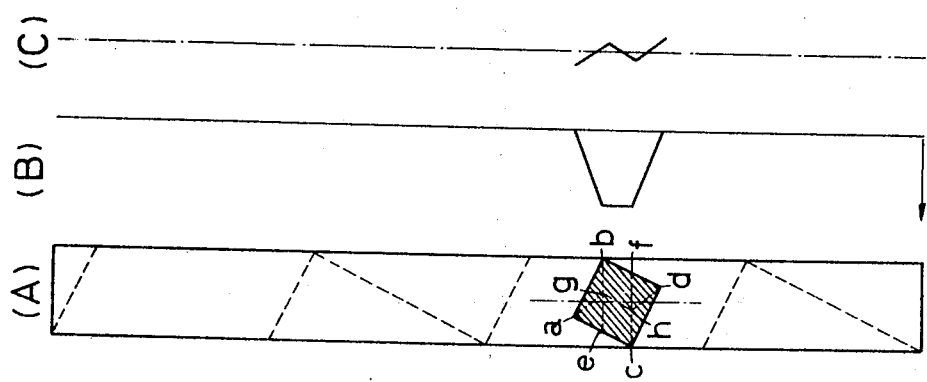

This principle described immediately above is equally applicable even when the dot area varies with the tone density in the original. In FIG. 4, five typical dot patterns each having a different dot area are shown as examples: FIG. 4A partially showing a halftone plate of a 5% dot area in its ratio and similarly, FIG. 4B—23%, FIG. 4C—50%, FIG. 4D—77% and FIG. 4E—95%. In all cases above, it will be easily understood that the halftone plate is cmposed of a plurality of identical dot patterns arranged in the same manner as that in FIG. 3. One typical dot pattern in each of FIGS. 4A to 4E is surrounded by two-dotted lines and such a dot pattern will be referred to as a "unit area" hereinafter in the specification. FIGS. 5A, 6A and 7A indicate such a typical dot pattern, or a unit area, only enlarged, having 5%, 23% and 50% dot areas respectively. FIG. 5A shows that a portion to be recorded in the unit area is only one square dot "abcd". In this case, assuming that the scanning is carried out top-to-bottom, no exposing beam is incident as far as a point "a", where a beam of substantially zero width is first incident. With the advance of the scanning, the beam width is gradually increased with its center travelling along the two-dotted line "ag" unitl the triangular area "aeb" is recorded.

Once the beam width has become as wide as "eb", it remains the same with its center moving along "gh" until a parallelogrammic area "ecfb" is recorded. Then, the beam width is gradually decreased with its center moving along "hd" so as to form another triangular area "dcf". The whole area thus exposed makes a square area "abcd".

FIGS. 5B and 5C graphically indicate the change of the beam width and the travelling path of the beam width center respectively during the above-described process for producing a 5% halftone dot.

It will thus be apparent from the above description that in order to record a halftone plate of 5% dot area, it is is required to repeat the above-mentioned process for each dot in the scanning line, and to generate lines of width $1/\sqrt{10}$ P side by side on the recording cylinder and with each line's phase delayed by $3/\sqrt{10}$ P in a circumferential direction of the cylinder with respect to the previous line.

As has been referred to before, FIGS. 4A and 5A illustrate part of a halftone image of a 5% dot area (approximately); two apexes "b" and "c" of the square dot being in contact with two-dotted lines representing scanning lines. Where the dot area is less than 5%, one complete dot can be recorded with one scanning operation. However, as shown in FIGS. 4B to 4E, FIGS. 6 and 7, when the dot area is greater than 5% (approximately), the dots, parts of which fall in a unit area, do not lie completely in it. That is, one complete dot cannot be formed with one scan since the dot width is larger than the width of the scanning line, which is $1/\sqrt{10}$ P. Therefore, according to the present invention, all the unit areas, in each of which only a part of a dot is formed, fit together so as to form a complete dot pattern as desired.

FIGS. 6 and 7 show unit areas having 23% and 50% dot areas respectively. The method for scanning these unit areas is basically similar to that for scanning a 5% halftone image. Namely, partial dots as shown in FIGS. 6A and 7A are recorded by changing the beam width as in FIGS. 6B and 7B and simultaneously by shifting its center as in FIGS. 6C and 7C during the scanning operation.

FIGS. 4D and 4E partially indicate halftone images of more than 50% dot area. A halftone image of a further increased dot area as shown may be similarly formed, except that in this case, the beam impinges upon and scans the whole width of the unit area, and part of the beam is intercepted whenever necessary, and that the width of the intercepted portion of the beam, not the beam width in this case, is suitably altered, and its center is shifted sideways. In this way, a halftone image having a more than 50% dot area may be reproduced. This process will be understood by reference to the process carried out in scanning a less than 5% halftone image.

According to the present invention an aperture contoured as shown in FIG. 8 is employed in order to control the beam width when forming dots of less than or equal to 50% area or the width of the intercepted portion of the beam, when forming dots of equal to or greater than 50% area. This aperture is composed of a combination of three triangles; one of them constituting an upper portion thereof to be utilized in controlling the beam width, and an opaque triangle shape formed between two other triangular apertures constituting a lower portion to be utilized in controlling the width of the intercepted portion of the beam. The upper and lower portions, both being of triangular shape, are in a positive-negative relationship to each other.

As has now become apparent, the upper portion of the aperture is used for recording a less than 50% halftone image, for example, for recording a square dot "abcd" in FIG. 9—same as that in FIGS. 4A and 5A. In this case, the passing position of the scanning beam on the aperture gradually moves downward from the top of the upper portion of the aperture toward the bottom so as to form the first triangular area ($\triangle$ aeb in FIG. 5A) and the beam stays at a position shown in FIG. 9B during the recording of a parallelogrammic area ($\square$ ecfb). Then, it moves upward for recording the second triangular area ($\triangle$ cdf). During the recording of the whole square area (abcd), the beam width continues to change as illustrated in FIG. 5B and its center also continues to shift as in FIG. 5C. Thus, a halftone image of a 5% dot area is formed.

FIG. 10 shows part of a 23% halftone image which is similarly recorded by a beam passing through the upper portion of the aperture. On the other hand, illustrated in FIG. 11 is part of a 77% halftone image in which a non-exposed portion is in register with an exposed portion in a 23% halftone image. In this case, part or all of the scanning beam is intercepted by the lower portion of the aperture. At the same time, the width of the intercepted portion of the beam changes and its center shifts sideways as in the case where the beam width changes and its center shifts in recording a 23% halftone image. It will thus be appreciated that the lower portion of the aperture lends itself to forming halftone images having more than 50% dot area.

Referring now to FIG. 12, wherein an apparatus for carrying out the method of the present invention for reproducing halftone images by scanning is perspectively illustrated, there are suitably arranged along the optical axis of beam 11 a first vertical deflection means 12, a convex cylindrical lens 13, a one-way diffusing plate 14, a relay lens 15, an aperture plate 16 having an aperture 17, a second vertical deflection means 18, a horizontal deflection means 19, a first focusing lens 20, a shielding means 21 having an aperture 22 and a second focusing lens 23.

The above-mentioned three deflection means 12, 18 and 19, being utilized for refracting or diffracting the scanning beam at a desired angle, may be conventional ones. In one embodiment of the invention, an acoustic-optical deflector utilizing an ultrasonic oscillator is employed for such a purpose. This deflector, as is already well known, is of a type which makes use of the fact that elastic deformation in a crystal caused by ultrasonic waves can function as a diffraction grating. This deflector is capable of suitably changing the pitch of the diffraction grating by controlling the frequency of the ultrasonic waves supplied to the crystal, so as to deflect the beam at an arbitrary diffraction angle. The deflector is capable of oscillating a beam at a deflection frequency of $10^5$ to $10^6$ Hz, and of controlling the amplitude of deflection angle as desired.

FIGS. 13 and 14 illustrate a front and a rear portion of the apparatus shown in FIG. 12; FIGS. 13A and 14A being side views, and FIGS. 13B and 14B being plan views thereof. When referring to FIGS. 13 and 14, it should be noted that the elements shown by solid lines either refract or deflect a beam while elements shown by phantom lines allow the beam to pass straight through, from the particular viewpoint of the figure. For instance, the first deflection means 12 is indicated by a solid line in FIG. 13A, though indicated by a phantom line in FIG. 13B, because it deflects the beam vertically but not horizontally.

Beam 11, before reaching the cylindrical lens 13, enters the first vertical deflection means 12 where it is vertically deflected at a angle depending upon the frequency of ultrasonic waves supplied thereto. The cylindrical lens 13 serves to converge vertically the beam 11 passing through the first deflection means 12 and to focus it onto the aperture plate 16. Further, the one-way diffusing means 14 diffuses the beam 11 only in the horizontal direction. A cylindrically lenticular sheet, for example, may be utilized as such a means 14. Thus, the beam having a flat contour, i.e., the horizontally-linear beam impinges upon the aperture 16 and moves up and down thereon according to the frequency of the ultrasonic waves supplied to the first vertical deflection means 12.

This linear beam 11, after being refracted at the relay lens 15 disposed adjacent to the aperture plate 16, enters the second vertical deflection means 18. The first and the second deflection means 12 and 18 are arraged in a conjugate relationship with each other with respect to the relay lens 15, and are equidistant from the lens 15. In other words, both means 12 and 18 are located at positions that are twice the focal length of the relay lens 15 away from it—although in this case an influence by cylindrical lens 13 has to be taken into consideration—so that the incident angle of the beam entering the second deflection means 18 is kept equal to its deflection angle at the first deflection means 12.

It will thus be appreciated that, when ultrasonic waves of the same frequency as that of those supplied to the first deflection means 12 are supplied to the second deflection means 18, the travelling path of the beam, after it emerges from the second deflection means 18, will again be parallel with the optical axis. Then the beam passes through the horizontal deflection means 19, where it is deflected according to the frequency of ultrasonic waves supplied thereto, and reaches the first focusing lens 20 adapted again to converge the beam. Along the beam path, there is provided a shielding means 21 having an aperture 22 thereon on which the converged beam is accurately focused. This means that the aperture plate 16 and the aperture 22 and conjugate with each other with respect to the first focusing lens 20.

The second focusing lens 23 serves finally to focus the beam onto a photosensitive material 24. In this instance, it should be noted that out of the horizontally deflected beam at the horizontal deflection means 19, only the part which has passed through the aperture 22 is projected upon the photosensitive material 24. The width of the impinging area of the beam on the material 24 of course varies with the dimension of the aperture 22 and the projecting magnification of the second focusing lens 23 as well. However, since the shielding means 21 having the aperture 22 is held stationary at a predetermined position, it is possible to predetermined the width of the impinging area so as to make it equal to the width of the scanning line, merely by adjusting the dimensions of the aperture 22 and the projecting magnification of the lens 23.

It will therefore be apparent from the foregoing that the contour of the beam to be projected upon the photosensitive material 24 depends entirely on how much the beam has been deflected by the above three deflection means.

For example, in the case that beam passes a position shown by a one-dotted line in FIG. 15A of the aperture 17, only the part of the beam shown by (a) in the same figure passes through. When the beam thus selected at the aperture 17 goes straight without being deflected by horizontal deflection means 19, it will be further selected by the aperture 22 and will be so contoured as illustrated by (b) in FIG. 15B. The resulting beam then impinges upon the material 24 and exposes thereon a linear portion of a halftone dot as shown by (d) in FIG. 15D. Similarly, in the case that the beam is horizontally deflected at the deflection means 19, the beam having passed through the slit 22 will be like (c) in FIG. 15C and an exposed portion by this beam on the material 24 will be like (e) in FIG. 15E. In this way, other portions of a halftone image may also be recorded by appropriately controlling the deflection angle of the beam so as to determine what position of the aperture 17 or the aperture 22 the beam should pass through.

In other words, the first deflection means 12 controls the vertical deflection angle of beam so that the passing position thereof at the aperture 17, which determines the beam width, may change as shown in FIGS. 5B, 6B and 7B, and at the same time the horizontal deflection means 19 controls the horizontal deflection angle of the beam so that the position of the beam, or the center of the beam width, may horizontally shift as shown in C of each figure; whereby a halftone image as illustrated in A of each figure may be reproduced.

According to the present invention, control signals are generated in a deflection control signal generator 25 capable of controlling such deflection angles of the beam in response to the requirements of screen angle and dot area; that is, control signals capable of changing the frequency of ultrasonic waves to be supplied to the three deflection means 12, 18 and 19 are produced. From among these memorized control signals a required signal is read out by an addressing signal obtained by scanning the original pattern so that ultrasonic waves of the required frequency are supplied to each deflection means 12, 18 or 19. In this way, it becomes possible to scan the photosensitive material 24 in synchronism with scanning the original pattern, thereby reproducing a halftone image.

The specific nature of the control signal generator 25 is not critical for purposes of the present invention. For example, the deflection control signal generator 25 shown in FIG. 16 stores control signals capable of controlling deflection angles of the beam for recording dots in response to the tone density of the original picture, the control signals being divided stepwise in groups each corresponding to a predetermined required dot area.

For example, the picture density signals which are to be recorded for a 5% dot area, as shown in FIG. 5A, are written in the memory 32 as the signals 5B and 5C which are for changing the beam width and the path of the beam center so as to produce such a dot. Since FIGS. 5B and 5C show diffraction angles of the beam, memorized values in the memory are not necesarily the same as FIGS. 5B and 5C. That is, when the values read out from the memory are voltages, the voltages are converted into ultrasonic waves which are fed to the three deflection means 12, 18 and 19 in which elastic deformation in a crystal caused by the ultrasonic waves functions as a diffraction grating. Then the beam passing through the deflection means is deflected at a desired angle by the diffraction grating.

Deflection control signals corresponding to each unit area are memorized in a row in the memory 32 and the desired control signals changing the beam width and the path of the beam center are read out by addressing by picture density signals. For example, these signals are shown in FIGS. 5B and 5C for a 5% dot area, FIGS. 6B and 6C for a 23% dot area and FIGS. 7B and 7C for a 50% dot area.

Figure 16:
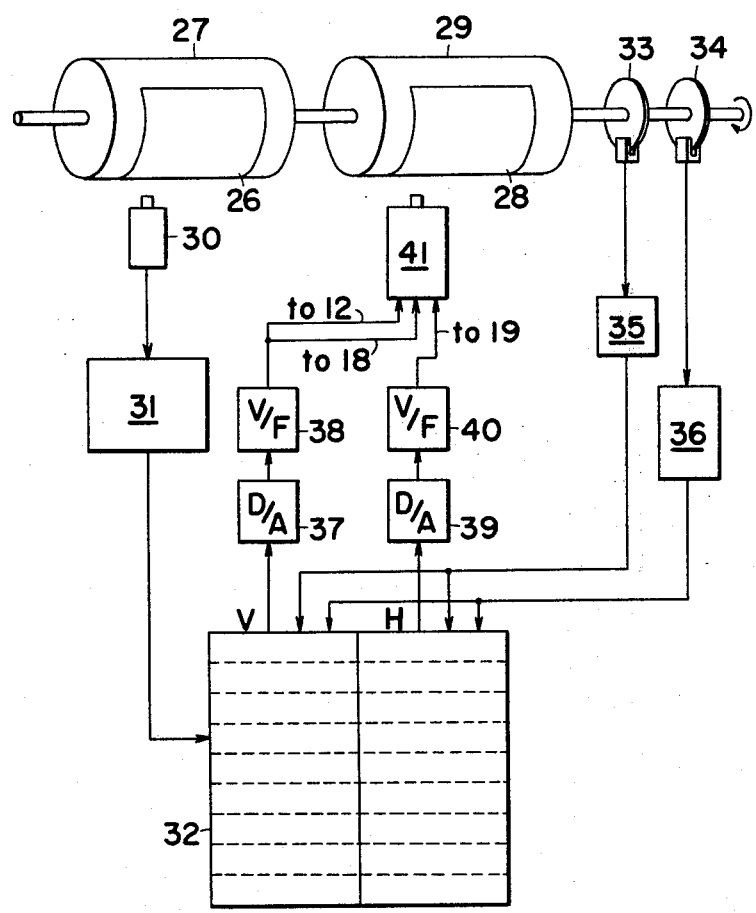
FIG. 16 is a schematic representation of one possible deflection control signal generator which can be used with the presently preferred embodiment of the invention shown in FIG. 12.

FIG. 16 shows a deflection control signal generator 25 comprising a level detector 31, memory 32 for vertical and horizontal deflections, digital-analog converters 37 and 39 for both deflections, voltage-frequency converters 38, 40 for both deflections, a frequency converter 35 and a read-out position address circuit 36.

An original picture cylinder 27 with an original picture 26 and a recording cylinder 29 with a film 28 are synchronously rotated, and a pick-up head 30 and a recording head 41 are also synchronously moved along the picture cylinder and the recording cylinder in the same manner as in connventional color scanners and color facsimile reproducers.

The original picture 26 is scanned by the pick-up head 30 including an optical system and a photoelectric converting element to generate picture signals which are fed to the level detector 31. The level detector 31 discriminates levels of the picture signals and assigns stepwise amounts of dot area of the halftone plate to be recorded (there are 21 steps when the dot area changes in 5% steps from 0% to 100%), and produces signals of a level corresponding to these dot areas, This, for example, is accomplished by providing as many comparators as steps, so that the comparator corresponding to the particular level of the picture signal produces the dot area signal. The dot area signals function as address signals for reading out deflection control signals of the beam stored in the memory 25.

The memory 32 may be either a conventional core memory or an IC memory and produces the stored deflection control signals which are fed to the three deflection means 12, 18 and 19 for deflection the beam. The stored deflection control signals are laid out in steps, each step corresponding to a particular level of halftone intensity, i.e., of dot area, and composed of predetermined vertical deflection control signals and horizontal deflection control signals for a unit area of dot pattern. Broken lines drawn in the memory 32 shown in FIG. 16 show diagrammatically the divisions of the above-mentioned steps.

The outputs of the level detector 31 are supplied to the memory 32 as addressing signals for producing stored signals for changing the beam width and the path of the beam center.

Two pulse generators 33 and 34 are driven synchronously with respect to the recording cylinder 29. The pulse generator 33 generates a large integral number of equally spaced pulses in each revolution of the cylinder 29 and the pulse generator 34 generates one pulse for every one revolution of the cylinder 29. The pulses from the pulse generator 33 are converted into clock pulses having a desired frequency by the frequency converter 35.

The frequency of the clock pulses is determined by the dot pitch of the halftone plate to be recorded and the scanning speed of the sensitive material. That is, the read-out sped of the signal values stored in the memory 32 is determined on the basis of the area to be covered on the scanned sensitive material by the unit area whose deflection signals are stored in the relevant step in the memory 32, and thus the frequency converter forms clock pulses having frequency corresponding to the read-out speed.

The pulses from the pulse generator 34 are fed to the memory 32 thorugh the read-out position address circuit 36 and delay the phase of the signal values read-out in response to the clock pulses from the memory to a predetermined extent. That is, the phase of the dot pattern of the unit area is delayed $3/\sqrt{10}$ P length every scanning cycle in FIGS. 3 and 4. In this case, the read-out position address circuit 36 shifts the addresses of the signal values read-out of the memory 32 in response to the clock pulses by an amount corresponding to $3/\sqrt{10}$ P on every receipt of the pulse from the pulse generator 34.

Thus, the vertical deflection control signals which are read out synchronously with respect to the scanning of the sensitive material 28 from the memory 32 are converted into voltages by the digital-analog converter 37 and then converted into high frequency signals by voltage-frequency converter 38. The vertical high frequency signals are fed to the beam deflection means 12 and 18. The horizontal deflection control signals are also converted into voltages and then high frequency signals in the digital-analog converter 39 and voltage-frequency converter 40, and then the horizontal high frequency signals are fed to the beam deflection beam 19.

Although there has heretofore been described a method and an apparatus for scanning and reproducing a halftone image with reference to the drawings, it should be understood that the described embodiment merely represents one of the preferred forms of the invention and that modifications and changes may be made without departing from the spirit or the scope of the invention.

For instance, although the above-described acoustic-optical apparatus is more suitable as beam deflection means particularly in view of the response frequency, an oscillating mirror or the like may also be utilized. Furthermore, in the illustrated embodiment, the aperture plate 16 comprises a beam-admitting portion and a beam-intercepting portion both of which are of the same shape. However, it is not necessary to make them of the same shape. It is feasible to alter their shape according to the tone-reproduction required for the resulting halftone image.

Furthermore, the whole apparatus has been explained under the assumption that the halftone plate to be produced has the screen angle of $\cot^{-1} 3$. In fact, it is possible to generate halftone plates of any screen angle $\cot^{-1} n$ where n is integral. The figure for $\theta$ of $\cot^{-1} 3$ has only been used for the purpose of an example.

What is claimed is:

1. Apparatus for reproducing a halftone image by scanning, wherein a scanning beam to be projected upon a photosensitive material is suitably controlled by means of image signals obtained from the scanning of an original, said apparatus comprising:

generating means means for generating image signals by scanning said original along a predetermined scanning direction, a light source for emitting a beam for exposure, first deflection means adapted for deflecting said beam in the scanning direction of the photosensitive material, second deflection means disposed downstream along the light beam of said first deflection means and adapted for deflecting the beam in a direction parallel to the scanning direction, an aperture plate disposed between said first and second deflection means and adapted for intercepting at least a portion of the width of the beam, third deflection means adapted for deflecting the beam which has passed through the second deflection means in a direction orthogonal to the scanning direction, an optical system for focusing the beam from said third deflection means onto the photosensitive material, and control means for controlling deflection angles at said first, second and third deflection means in response to the intensity of said image signals.

2. An apparatus according to claim 1, further including screening means having an aperture for limiting the width of said beam to be projected on the photosensitive material to a predetermined value.

3. An apparatus according to claim 1, wherein said aperture plate has a beam-admitting aperture and a beam-intercepting portion.

4. An apparatus according to claim 1, wherein said first, second and third deflection means are acoustic-optical deflectors utilizing ultrasonic oscillators.

5. An apparatus according to claim 1, wherein said aperture plate is adapted to separate the beam into separate spaced beam portions when recording a halftone image equal to at least 50%.

6. An apparatus according to claim 1, wherein said aperture plate has an aperture one part of which is triangle-shaped and is used to modify the beam when recording a halftone image of less than or equal to 50% dot area.

7. An apparatus according to claim 1, wherein said aperture plate has an aperture one part of which has an opague triangle shape protruding into it, said part being used to modify the beam when recording a halftone image of less than or equal to 50% dot area.

8. An apparatus according to claim 1, further including a further optical system for converging, in the direction parallel to the scanning direction, the beam deflected at the first deflection means onto said aperture plate and diffusing said beam to make it flat in the direction orthogonal to the scanning direction.

9. An apparatus according to claim 8, wherein said further optical system comprises a cylindrical plate and a one-way diffusion lens.

10. A method for reproducing a halftone image corresponding to an original picture, comprising the steps of:

(a) scanning the original picture and generating a picture signal which is a function of the tone and intensity thereof;

(b) forming two halftone control signals on the basis of said picture signal;

(c) producing a scanning light beam, which when focused is of very small height in comparison to its width;

(d) varying the width of the scanning beam in accordance with one of said halftone control signals, and varying the position of its center, in the widthwise direction, in accordance with the other of said halftone control signals; and (e) scanning the scanning beam along a piece of photosensitive material in the direction orthogonal to the widthwise direction, said halftone control signals being functions of time and of said picture signal for the beam to expose a pattern on the photosensitive material which consists of halftone dots which represent the original picture.

11. A method according to claim 10, wherein at a point of focusing of said beam there is placed in the path of the beam an aperture plate, and wherein in the path of the beam, both before and after the aperture plate, there are placed means for deflecting the beam in directions orthogonal to its widthwise direction, said one halftone control signal being fed to both of said deflecting means and controlling them so as to deflect the beam in opposite senses, so that the beam, after having passed both said deflecting means, is substantially undeflected in the direction orthogonal to its widthwise direction, and so that the beam, where it passes the aperture plate, is moved substantially in the direction orthogonal to its widthwise direction as a function of said one halftone control signal, said aperture plate intercepting a varying portion of said beam as it is thus moved.

12. A method according to claim 11, wherein said aperture plate has a first portion which is configured to allow only a section of the beam which is of a width which varies according to the lengthwise deflection of the beam to pass, and a second portion which is configured to intercept a portion of the beam which is of a width which varies according to the lengthwise deflection of the beam, allowing parts of the beam on both sides of said intercepted portion of the beam to pass, and wherein said first portion is used when recording halftone dots which have less than or equal to 50% dot area, and the second portion is used when recording halftone dots which have greater than or equal to 50% halftone dot area.

13. A method according to claim 10, wherein at a point of focusing of said beam, said step of varying said width comprises the step of deflecting the beam in directions orthogonal to its widthwise direction both before and after an aperture plate which is placed in the path of the beam, said orthogonal deflections being a function of said one halftone control signal which is used to deflect the beam in opposite senses on opposite sides of said aperture plate, so that the beam, after having been twice deflected, is substantially undeflected in the direction orthogonal to its widthwise direction. and so that the beam, where it passes the aperture plate, is moved substantially in the direction orthogonal to its widthwise direction as a function of said one halftone control signal, said aperture plate intercepting a varying portion of said beam as it is thus moved.

14. A method according to claim 13, wherein said aperture plate has a first portion which is configured to allow only a section of the beam which is of a width which varies according to the lengthwise deflection of the beam to pass, and a second portion which is configured to intercept a portion of the beam which is of a width which varies according to the lengthwise deflection of the beam, allowing parts of the beam on both sides of said intercepted portion of the beam to pass, and wherein said first portion is used when recording halftone dots which have less than or equal to 50% dot area, and the second portion is used when recording halftone dots which have greater than or equal to 50% halftone dot area.

15. A method for reproducing a halftone image corresponding to an original picture, comprising the steps of:
(a) scanning the original picture and generating a picture signal which is a function of the tone and intensity thereof;
(b) forming two halftone control signals on the basis of said picture signal;
(c) producing a scanning light beam, which when focused is of very small height in comparison to its width;
(d) varying the width of an intercepted portion of the beam in accordance with one of said halftone control signals, and varying the position of the center of said intercepted portion, in the widthwise direction, in accordance with the other of said halftone control signals; and
(e) scanning the scanning beam along a piece of photosensitive material in the direction orthogonal to the widthwise direction, said halftone control signals being functions of time and of said picture signal for the beam to expose a pattern on the photosensitive material which consists of halftone dots which represent the original picture.

16. A method according to claim 15, wherein at a point of focusing of said beam there is placed in the path of the beam an aperture plate, and wherein in the path of the beam, both before and after the aperture plate, there are placed means for deflecting the beam in directions orthogonal to its widthwise direction, said one halftone control signal being fed to both of said deflecting means and controlling them so as to deflect the beam in opposite senses, so that the beam, after having passed both said deflecting means, is substantially undeflected in the direction orthogonal to its widthwise direction, and so that the beam, where it passes the aperture plate, is moved substantially in the direction orthogonal to its widthwise direction as a function of said one halftone control signal, said aperture plate intercepting a varying portion of said beam as it is thus moved.

17. A method according to claim 16, wherein said aperture plate has a first portion which is configured to allow only a section of the beam which is of a width which varies according to the lengthwise deflection of the beam to pass, and a second portion which is configured to intercept a portion of the beam which is of a width which varies according to the lengthwise deflection of the beam, allowing parts of the beam on both sides of said intercepted portion of the beam to pass, and wherein said first portion is used when recording halftone dots which have less than or equal to 50% dot area, and the second portion is used when recording halftone dots which have greater than or equal to 50% halftone dot area.

18. A method according to claim 15, wherein at a point of focusing of said beam, said step of varying said width comprises the step of deflecting the beam in directions orthogonal to its widthwise direction both before and after an aperture plate which is placed in the path of the beam, said orthogonal deflections being a function of said one halftone control signal which is used to deflect the beam in opposite senses on opposite sides of said aperture plate, so that the beam, after having been twice deflected, is substantially undeflected in the direction orthogonal to its widthwise direction, and so that the beam, where it passes the aperture plate, is moved substantially in the direction orthogonal to its widthwise direction as a function of said one halftone control signal, said aperture plate intercepting a varying portion of said beam as it is thus moved.

19. A method according to claim 18, wherein said aperture plate has a first portion which is configured to allow only a section of the beam which is of a width which varies according to the lengthwise deflection of the beam to pass, and a second portion which is configured to intercept a portion of the beam which is of a width which varies according to the lengthwise deflection of the beam, allowing parts of the beam on both sides of said intercepted portion of the beam to pass, and wherein said first portion is used when recording halftone dots which have less than or equal to 50% dot area, and the second portion is used when recording halftone dots which have greater than or equal to 50% halftone dot area.

20. A method for reproducing a halftone image corresponding to an original picture signal, comprising the steps of:
   (a) scanning the original picture along a predetermined lengthwise direction and generating a picture signal which is a function of the tone and the intensity thereof;
   (b) forming two halftone control signals on the basis of said picture signal;
   (c) producing a scanning light beam which when focused is of very small height in comparison to its width;
   (d) passing said beam through a first means for deflecting it in the lengthwise direction;
   (e) focusing said beam on an aperture plate;
   (f) passing said beam through a second means for deflecting it in the lengthwise direction;
   (g) passing said beam through a third means for deflecting it in the widthwise direction normal to the lengthwise direction; and
   (h) focusing said beam on a piece of photosensitive material which is moved in the lengthwise direction of the beam,
   said first and second deflecting means being fed with and controlled by one of said halftone control signals, and deflecting the beam in opposite senses, so that the beam, where it is focused on the photosensitive material, is not substantially deflected in the lengthwise direction, and so that, where the beam is focused on said aperture plate, it is deflected substantially in the lengthwise direction, said aperture plate intercepting a varying portion of said beam as it is thus deflected,
   said third deflecting means being fed with and controlled by the other of said halftone control signals,
   said halftone control signals being functions of time and said picture signal for the beam to expose a pattern on the photosensitive material which consists of halftone dots which represent the original picture.

21. A method according to claim 20, further including the step of passing the beam past a screening plate, said step being performed prior to focusing of said beam on a piece of photosensitive material, said screening plate intercepting any portions of the beam which are more than a certain fixed distance from a central point.

22. A method for reproducing a halftone image corresponding to an original picture, comprising the steps of:
   (a) scanning the original picture and generating a picture signal which is a function of the tone and intensity thereof;
   (b) forming two halftone control signals on the basis of said picture signal;
   (c) producing a scanning light beam, which when focused is of very small height in comparison to its width;
   (d) selectively transmitting a portion of said beam through a screening plate during formation of halftone dot areas below a predetermined value and intercepting a portion of said beam through said screening plate during formation of halftone dot areas above said predetermined value;
   (e) varying the width of the respective transmitted and intercepted beam portions in accordance with one of said halftone control signals, and varying the positions of their centers, in their widthwise directions, as a function of said other of said halftone control signals; and
   (f) scanning the scanning beam along a piece of photosensitive material in the direction orthogonal to the widthwise direction,
   said halftone control signals being functions of time and of said picture signal for the beam to expose a pattern on the photosensitive material which consists of halftone dots which represent the original picture.

* * * * *